United States Patent [19]

Galle et al.

[11] Patent Number: 4,844,511

[45] Date of Patent: Jul. 4, 1989

[54] TUBULAR CONNECTOR

[75] Inventors: Gary L. Galle; Paul C. Berner, Jr., both of Houston, Tex.

[73] Assignee: Cameron Iron Works USA, Inc., Houston, Tex.

[21] Appl. No.: 228,754

[22] Filed: Aug. 4, 1988

Related U.S. Application Data

[63] Continuation of Ser. No. 946,041, Dec. 24, 1986, abandoned.

[51] Int. Cl.$^4$ ............................................. F16L 37/12
[52] U.S. Cl. .................................. 285/18; 285/308; 285/315; 285/920
[58] Field of Search .................. 285/18, 34, 35, 86, 285/308, 315, 920, 306, 322, 323; 166/359, 351, 340, 338

[56] References Cited

U.S. PATENT DOCUMENTS

| | | | |
|---|---|---|---|
| 3,239,248 | 3/1966 | Jones | 285/920 X |
| 3,241,864 | 3/1966 | Shaffer | 285/18 |
| 3,321,217 | 5/1967 | Ahlstone | 285/18 |
| 3,333,870 | 8/1967 | Watkins | 285/18 |
| 3,353,595 | 11/1967 | Nelson et al. | 166/6 |
| 3,608,932 | 9/1971 | Brown | 285/18 |
| 3,842,914 | 10/1974 | Mott | 285/34 |
| 3,918,485 | 11/1975 | Weber et al. | 137/594 |
| 4,232,888 | 11/1980 | Amancharla | 285/18 |
| 4,456,070 | 6/1984 | Watkins | 285/18 |
| 4,496,172 | 1/1985 | Walker | 285/18 |
| 4,526,406 | 7/1985 | Nelson | 285/18 |
| 4,593,937 | 6/1986 | Schawann et al. | 285/18 |
| 4,662,785 | 5/1987 | Gibb et al. | 285/315 X |

Primary Examiner—Randolph A. Reese
Assistant Examiner—Anthony Knight

[57] ABSTRACT

An improved tubular connector having a first tubular member with an external hub, an internal sealing surface and an external rib spaced from the hub, a second tubular member with an external hub, an internal sealing surface and an external dividing rib, a sleeve surrounding and slidable on the second tubular member and having an enlarged end extending beyond the end of the tub of the second tubular member in the retracted position of the sleeve, the sleeve having an internal rib engaging the exterior of the second tubular member and an internal tapered surface, a plurality of latching fingers supported between the interior of the sleeve and the exterior of the second tubular member, means for delivering fluid pressure to the space between the sleeve and the exterior of the second tubular member for movement of the sleeve in the direction toward the hub end of the second tubular member, means for limiting the movement of the latching members in the direction of movement of the sleeve whereby engagement of the latching members by the internal tapered surface cams the latching members into tight clamping engagement with the hubs of the tubular members and seal means for engaging and sealing against the internal sealing surfaces of the tubular members.

8 Claims, 5 Drawing Sheets

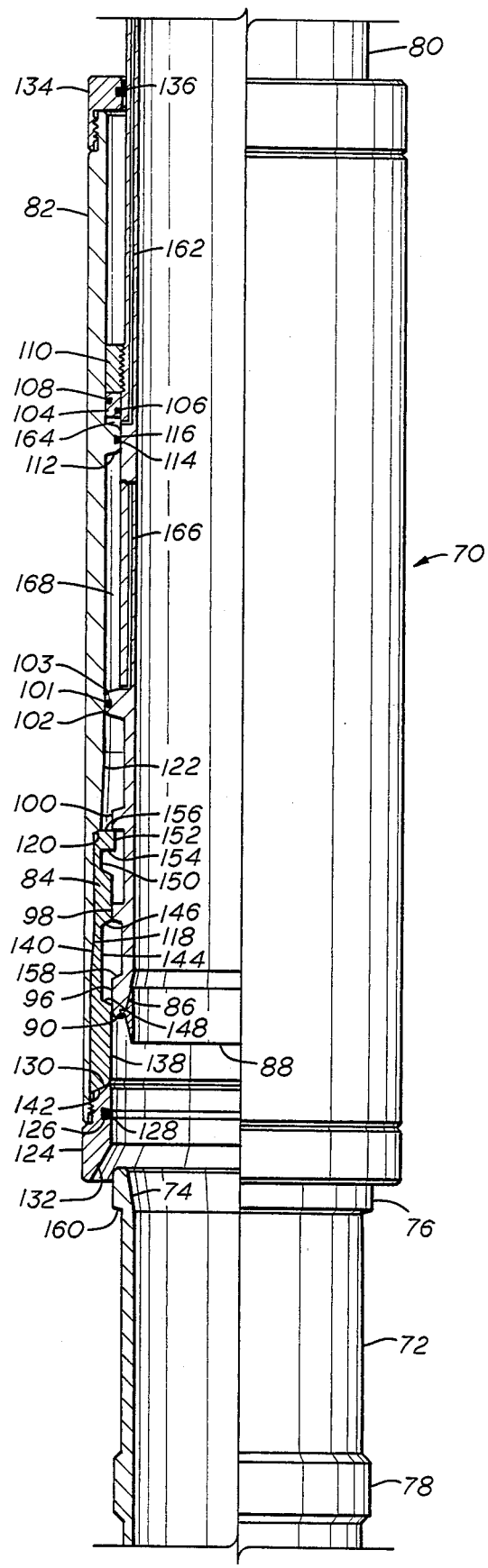
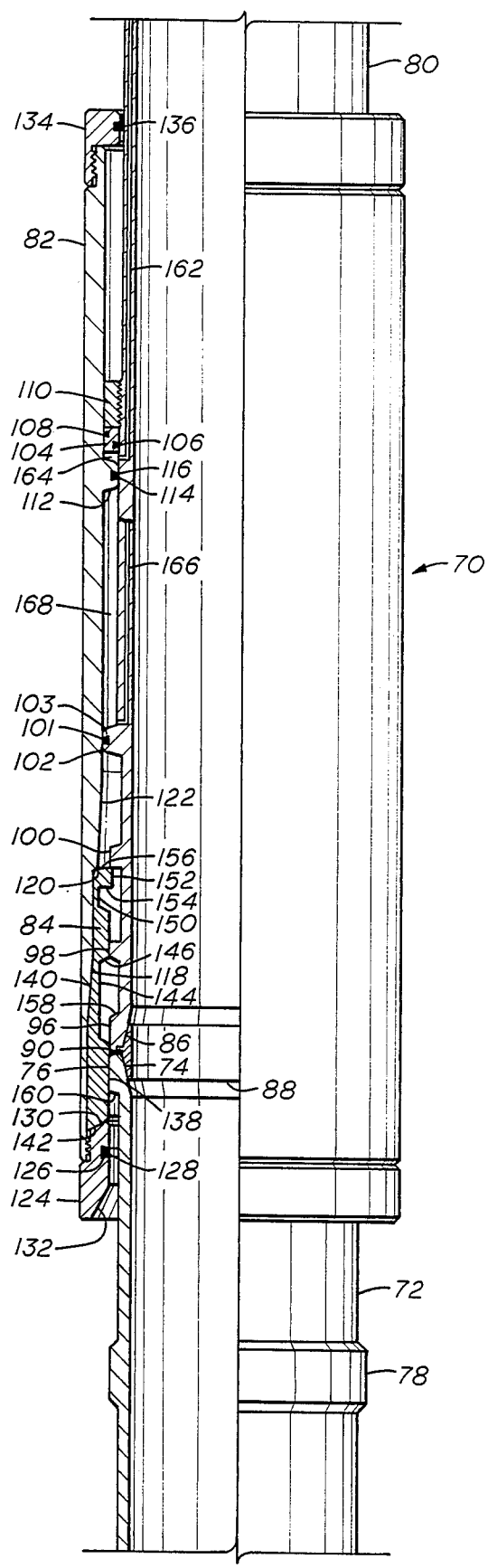
FIG. 3
FIG. 4

TUBULAR CONNECTOR

This application is a continuation of application Ser. No. 946,041, filed Dec. 24, 1986, now abandoned.

BACKGROUND

Tubular connectors are commonly used in subsea and downhole locations. In such locations the connector are exposed to corrosive conditions and to the wear and detrimental affects of sediment, dirt, and circulating fluids. Further in such applications for a tubular connector, it is most advantageous if the tubular connector has as small a diameter as possible to conserve diametrical space.

In the prior art there have been many tubular connectors which could be remotely operated. A typical example of such connectors is the collet type of connectors which are disclosed in U.S. Pat. Nos. 3,321,217 and 3,353,595. Each of these devices are operated by a plurality of pressure responsive means or hydraulic actuators which cam a clamping means into engagement with mating portions of the end of the tubular member opposed to the tubular member carrying the pressure responsive means. Such connectors are not suitable for use in spaces of confined diameter. They also have the disadvantage that the latching elements are not protected from the corrosive and other adverse condition of the environment in which the unit is to be installed.

Another example of the prior art is disclosed in U.S. Pat. No. 3,241,864 which includes a lower lead-in funnel shape to guide the entrance of the upper end of the tubular member into the connector. The locking is automatically accomplished through the use of a plurality of resilient circumferentially spaced fingers extending from an upper tubular body and such fingers latch into and out of a latching groove on the exterior of the tubular member which is to be engaged by the connector. A similar structure is disclosed in U.S. Pat. No. 3,918,485. This structure includes the flexible latching fingers and also adds an actuated camming collar which cams the fingers into their latching position or releases them from such position. The latching fingers are exposed to the local environment.

Another structure of the prior art is hereinafter disclosed with respect to the structure disclosed in FIG. 2 of the drawings. While such structure has been found suitable for downhole applications, it does not protect its latching elements from the environment in which it is installed. In all prior art structures of tubular connectors, such structures do not protect their latching means and many also are not suitable for installation in spaces of restricted diameter.

SUMMARY

The present invention is directed to an improved tubular connector which is suitable for use in subsea or downhole locations. The improved tubular connector includes a first tubular member with an enlarged external end portion, an external rib spaced from said enlarged external end portion and an internal tapered end sealing surface, a second tubular member having an enlarged external end portion and an internal tapered end sealing surface, a sleeve surrounding and slidable on said second tubular member and having an enlarged end extending beyond said second tubular member with an inner surface tapering inwardly and toward said second tubular member, said sleeve being spaced from said second tubular member to provide an annular pressure chamber for moving said sleeve along said second tubular member, a plurality of latching fingers positioned within said sleeve and having projections for engaging said external enlargements of said tubular members, mating cam surfaces on said latching fingers and within said sleeve whereby movement of said sleeve to extend beyond said second tubular member cams said latching fingers into secure engagement with said enlargements and brings said sleeve enlargement into sealing engagement with said external rib on said first tubular section to insulate said latching fingers from both the interior and exterior of said tubular members.

An object of the present invention is to provide an improved tubular connector which is suitable for use in subsea and downhole applications and in which the latching means is protected from the local environnent.

Another object is to provide an improved tubular connector having a retained metal seal ring for metal-to-metal sealing between the tubular members.

A further object is to provide an improved tubular connector which can be used in small bore size applications.

Still another object is to provide an improved tubular connector providing guidance between the two members to ensure proper mating of the connection.

BRIEF DESCRIPTION OF THE DRAWINGS

These and other objects and advantages of the present invention are hereinafter set forth and explained with reference to the drawings wherein:

FIG. 3 is a quarter sectional view of the improved tubular connector of the present invention with the two tubular members spaced apart and ready for the connection to be made.

FIG. 4 is a quarter sectional view of the connector with the members commencing their interengagement.

DESCRIPTION OF THE PREFERRED EMBODIMENT

Figure 1:
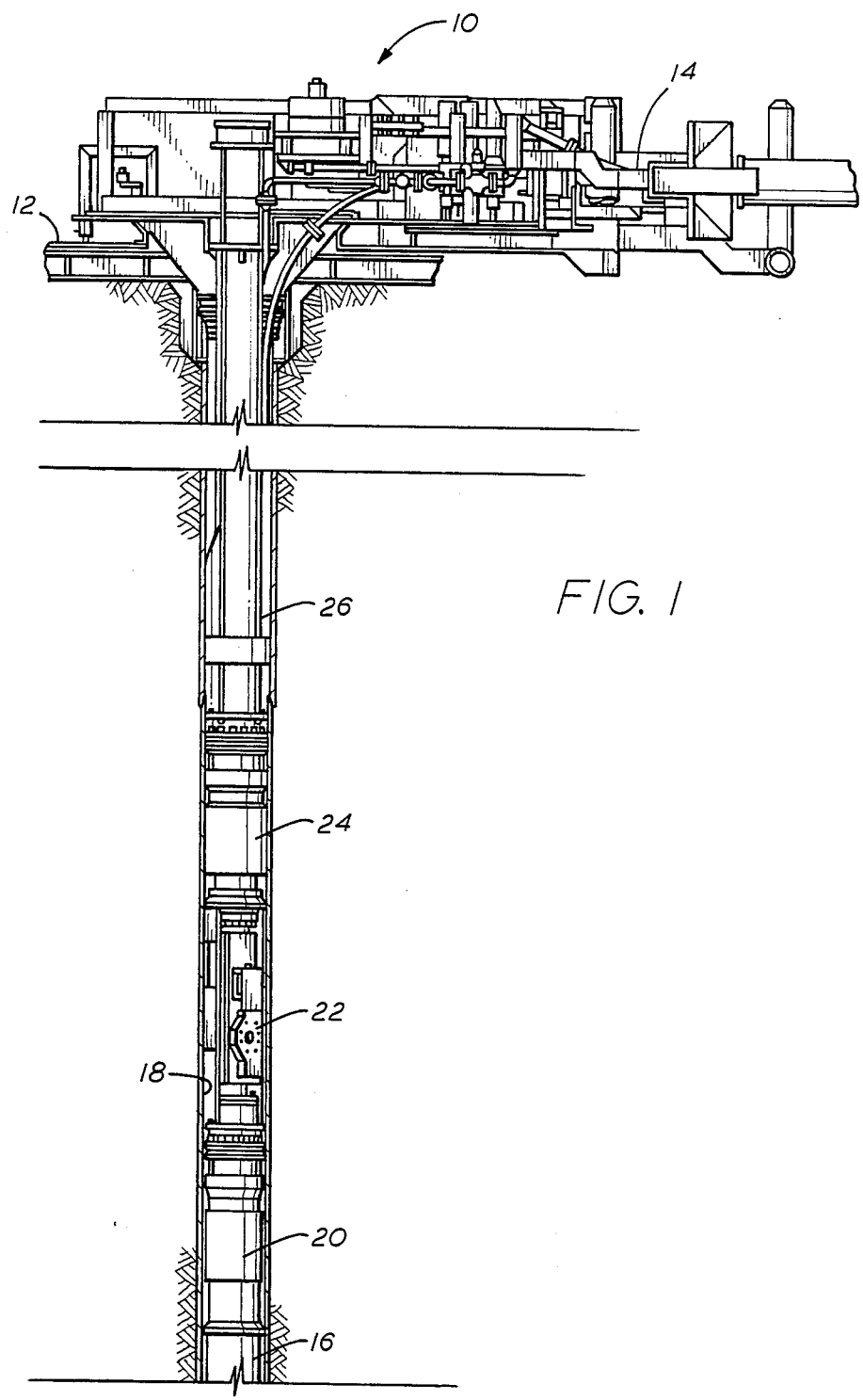
FIG. 1, is an elevation view of a subsea wellhead showing the use of the tubular connection of the present invention in a wellbore.

In FIG. 1 subsea well 10 is illustrated including mudline support 12 on which flowline connector 14 is supported, wellhead 16 within wellbore 18 and connected through connector 20, master valve assembly 22, connector 24 and flowline extension spool 26 to the equipment on support 12 including connector 14. Connectors 14, 20 and 24 are the type of connector applications for which the tubular connector of the present invention is suitable.

Figure 2:
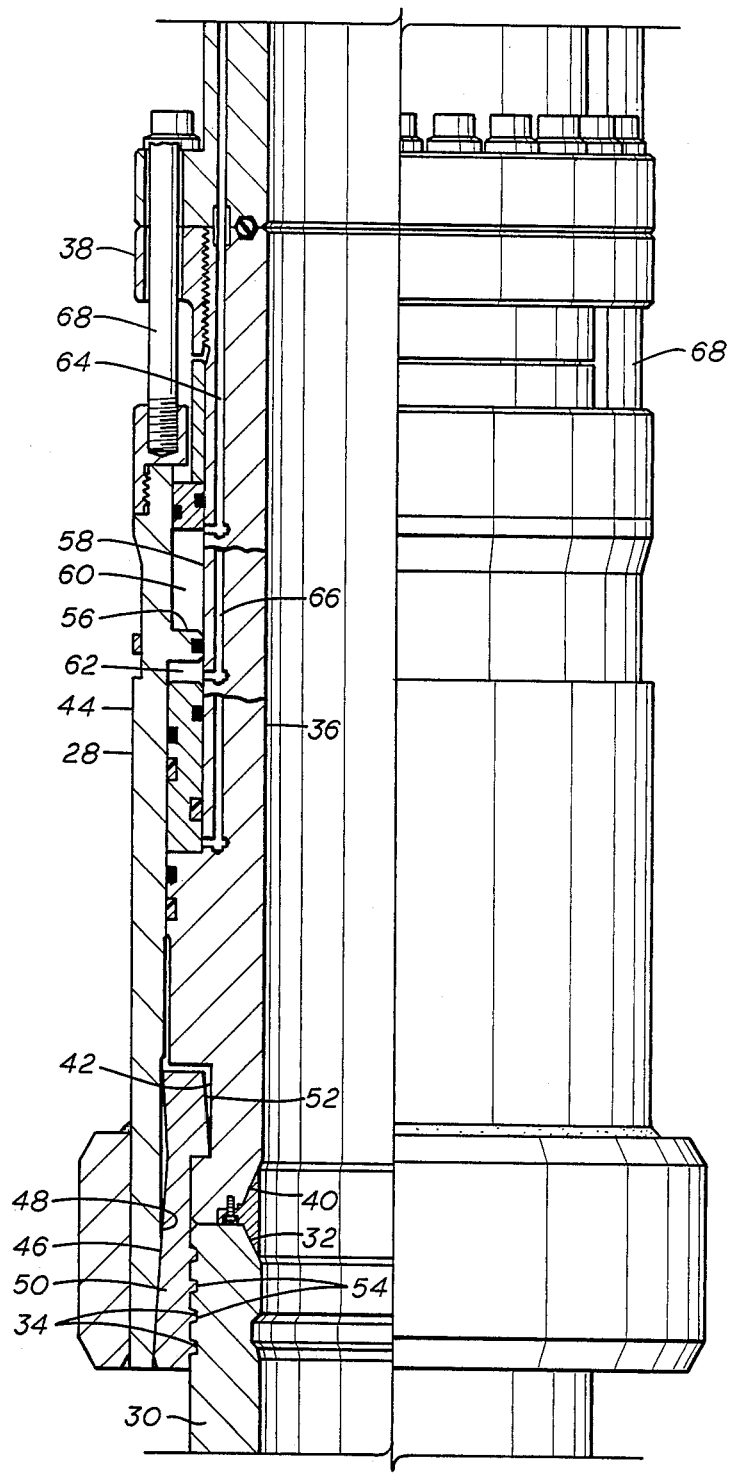
FIG. 2, is a quarter sectional view of a tubular connector of the prior art which has been used in a wellbore.

Prior art connector 28, shown in FIG. 2, has been used in such installations. Connector 28 includes first tubular member 30 having on its upper end internal tapered end sealing surface 32 and external engagement grooves 34, and second tubular member 36 having flange 38 on its upper end, and lower end internal tapered sealing surface 40 and external latch foot groove 42 on its lower end, sleeve 44 surrouhding second tubular member 36 with latching fingers 46 positioned between the lower interior surface 48 of sleeve 44 and the lower exterior of second tubular member 36. Latching fingers 46 include body 50, internal foot 52 on their upper end which projects into latch foot groove 42 and internal lands or ribs 54 which are spaced and sized for latching engagement within external engagement grooves 34 in the upper end of first tubular member 30.

Sleeve 44 is slidably mounted on the exterior of second tubular member 36 and includes internal rib 56 which projects into upper external recess 58 in second tubular member 36. With suitable sealing recess 58 defines upper and lower piston chambers 60 and 62 to which hydraulic fluid is delivered alternately through passages 64 and 66 respectively. When fluid pressure is delivered to upper chamber 60 sleeve 44 is moved downwardly on member 36 and causes latching fingers 46 to be cammed inwardly by the engagement of the internal surface of sleeve with the external surfaces of fingers 46 into latching engagement within engagement grooves 34 and latch foot groove 42 to thereby complete the connection between the two tubular members. Guide rods 68 are secured to the upper end of sleeve 28 and extend through suitable openings in flange 38.

As can be seen from the drawings and the foregoing description, tubular connector 28 has its latching fingers 46 and the interior of its sleeve 44 below chambers 60 and 62 exposed to the environment surrounding tubular members 30 and 32. Further, with the prior art connector 28, difficulty can be encountered with the entry of the upper end of first tubular member 30 within the latching fingers 44.

Improved connector 70 of the present invention is illustrated in the other figures. Connector 70 includes lower tubular member 72 having upper internal tapered sealing surface 74, upper external annular hub or rib 76 and lower external rib 78 spaced below upper rib 76 by a preselected distance as hereinafter explained. Connector 70 also includes upper tubular member 80, sleeve 82 and latching fingers 84.

Figure 7A:
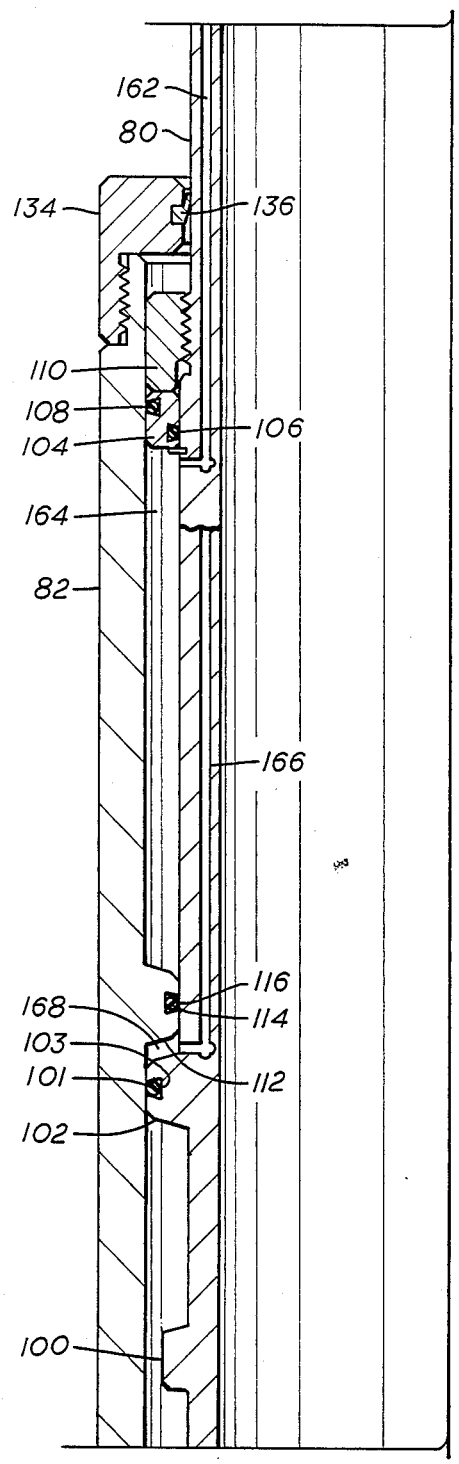
FIG. 7 includes FIGS. 7A and 7B which are partial enlarged sectional views of the connector in its connected and latched position with FIG. 7B showing the lower portion or extension of the connector shown in FIG. 7A
Figure 7B:
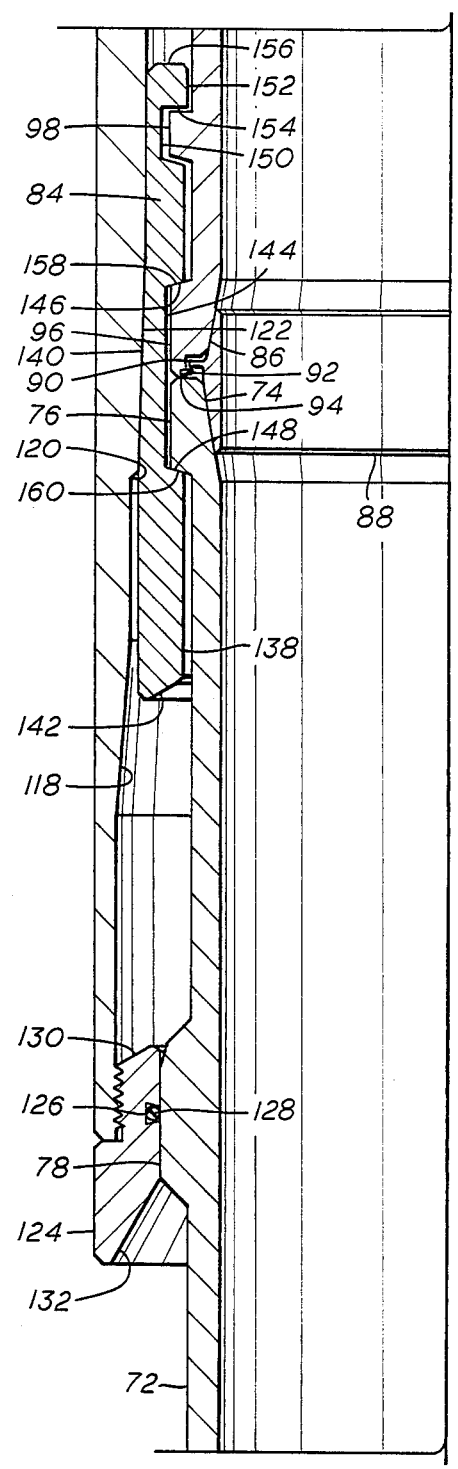

Upper tubular member 80 incldues lower internal tapered sealing surface 86 with seal ring 88 positioned thereon and retained by its external rib 90 being engaged by snap ring 92 in internal groove 94 near the lower end of tubular member 80 as best shown in FIG. 7. Tubular member 80 includes lower outer hub or rib 96, external setting rib 98 spaced above rib 96, external release rib 100 spaced above rib 98 and chamber defining external rib 102 spaced above rib 100 all as shown and hereinafter described in detail. O ring 101 is positioned in groove 103 on the outer surface of rib 102 for sealing against the interior surface of sleeve 82. Sealing ring 104 is positioned in surrounding relationship to the exterior of upper tubular member 80 spaced above rib 102 and includes internal seal 106 and external seal 108 which seal respectively against the exterior surface of tubular member 80 and the interior of sleeve 82. Lock ring 110 is threaded onto tubular member 80 as shown and provides the upper shoulder against which sealing ring 104 abuts.

Sleeve 82 surrounds the lower end of upper tubular member 80 with its lower end projecting beyond the lower end of member 80 as member 80 is being lowered toward lower tubular member 72 as shown in FIG. 3. Sleeve 82 includes internal rib 112 with O ring 114 positioned in groove 116 on the interior of rib 112 and adapted to seal against exterior surface of upper tubular member 80 between rib 102 and sealing ring 104. Sleeve 82 includes lower internal surface 118 which tapers inwardly and upwardly to receive the exterior of latching fingers 84 in their unlatched position. Tapered shoulder 120 is positioned at the upper end of surface 118 and tapers inwardly and upwardly between surface 118 and upper internal tapered surface 122. Ring 124 is threaded onto the lower end of sleeve 82 and includes internal groove 126 in which 0 ring 128 is positioned, upper surface 130 which tapers upwardly and inwardly to receive the lower ends of latching fingers 84 and lower surface 132 which has a shallow taper to assist in the centering of lower tubular member 72 within sleeve 82. Ring 134 is threaded onto the upper end of sleeve 82 and includes internal wiping seal 136 which engages the exterior of tubular member 80 above ring 110.

Latching fingers 84 include body 138 with outer surface 140 which tapers upwardly and inwardly, lower tapered surface 142 which engages surface 130 of ring 124, internal groove 144 with tapered shoulders 146 and 148 at its upper and lower ends, upper internal groove 150 which terminates in rib 152 with lower shoulder 154 and upper shoulder 156. Groove 144 is sized so that shoulders 146 and 148 can engage shoulder 158 on the upper portion of rib 96 on upper tubular member and shoulder 160 on the lower portion of external rib 76 on lower tubular member 72 in clamping engagement to retain upper tubular member 80 and lower tubular member 72 in tight sealing engagement with seal ring 88.

Improved tubular connector 70 is made up with sleeve 82 positioned around upper tubular member 80 as shown in FIG. 3 with lower ring 124 extending below the lower end of upper tubular member 80. In this position the unit is lowered into position aligned with and approaching the upper end of lower tubular member 72. As ring 124 reaches hub 76 of lower tubular member 72, its tapered surface 132 aids in centering lower tubular member 72 within sleeve 82. Once hub 76 enters the interior of ring 124 it is in a cylindrical path leading to its engaged and sealed position with respect to the lower end of upper tubular member 80 and sealing ring 88. This cylindrical path is formed by the interior of ring 124 and the interior of the lower portion of latching fingers 84 which extend upward into surrounding relationship to hub 96 on upper tubular member 80.

Figure 5:
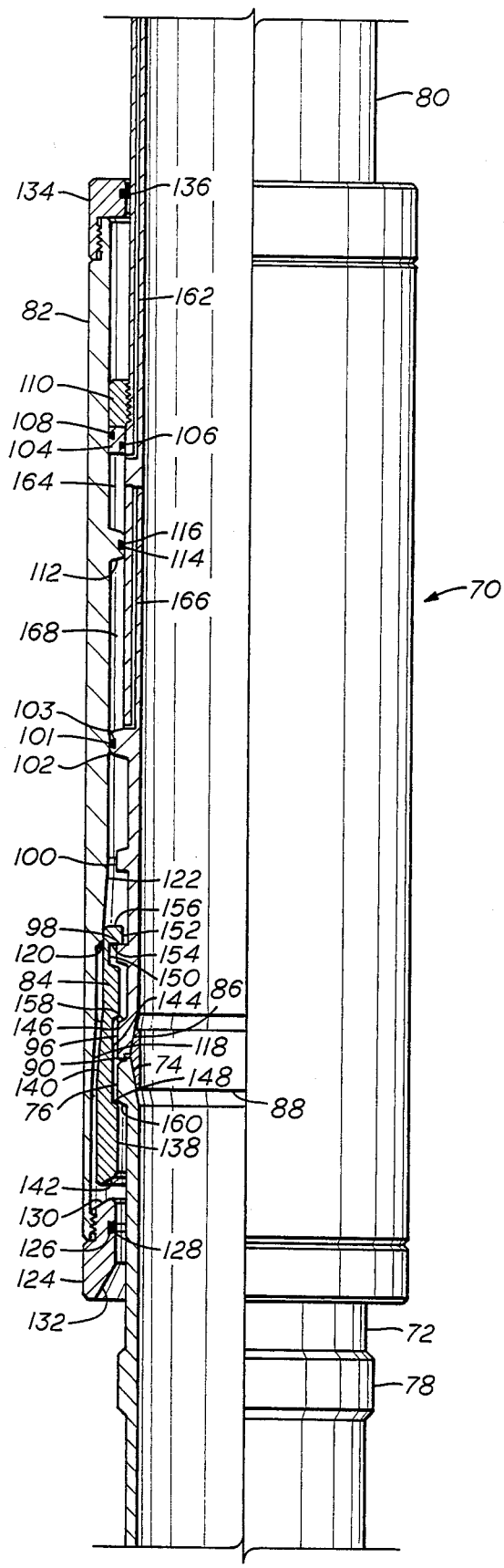
FIG. 5 is another similar view of the connector with the members progressing and the latching fingers partially set.
Figure 6:
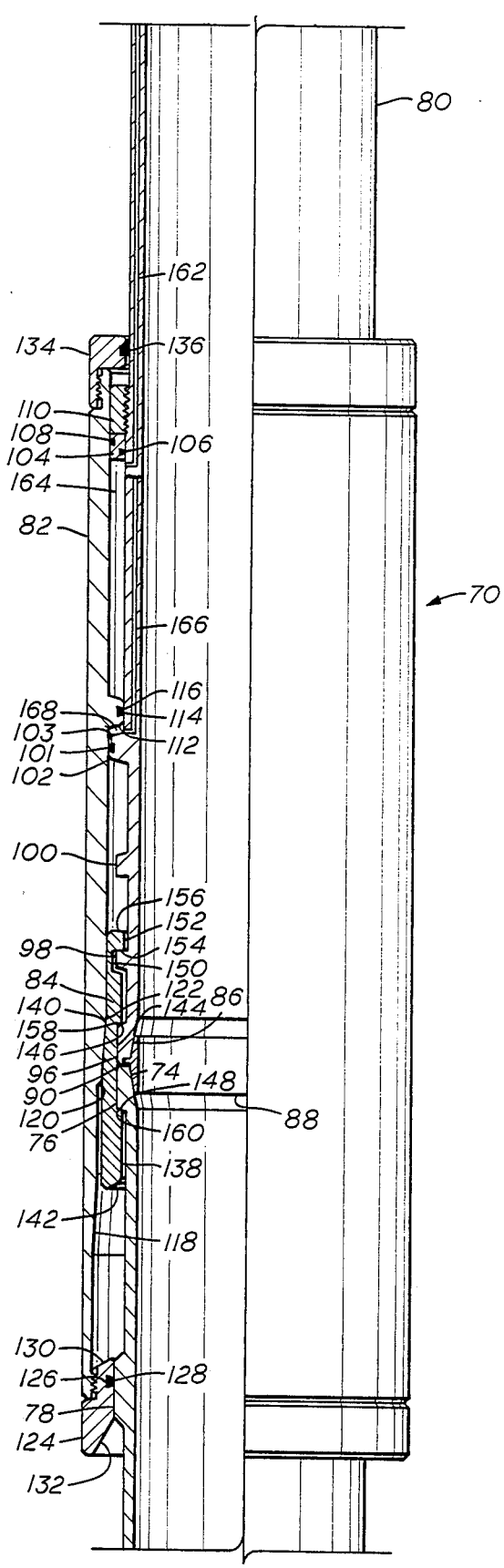
FIG. 6 is another similar view of the connector in its connected and latched position.

Once engagement of hub 76 with hub 96 and seal ring 88 is achieved as shown in FIG. 4, pressure is conducted through passage 162 in upper tubular member 80 into setting chamber 164 between sealing ring 104 and internal rib 112 on sleeve 82 and venting passage 166 and release chamber 168. This pressure causes sleeve 82 to move downwardly carrying latching fingers 84 in their position within surface 118. At the point as shown in FIG. 5, lower shoulder 154 on rib 152 has engaged the upper surface of rib 98 and further downward movement of latching fingers 84 has been prevented. The continued downward movement of sleeve 82 responsive to the pressure in setting chamber 164 has caused latching fingers 84 to be forced upwardly over tapered shoulder 120 into engagement with surface 122 as shown. The taper of surface 122 cams latching fingers 84 inwardly so that hubs 76 and 96 are received within internal groove 144 of latching fingers 84. The camming action of the further movement of sleeve 82 causes shoulders 146 and 148 to wedge tightly against shoulders 158 and 160 of hubs 96 and 76 to thereby bring tubular members 72 and 80 into latched position with seal ring 88 fitting in tight metal-to-metal sealing engagement with surfaces 74 and 86 of the two tubular members as illustrated in FIGS. 6 and 7.

It should be noted from the drawings that in such latched position, O ring 128 on the interior of ring 124 is positioned in sealing engagement with the exterior surface of rib 78 and seal 136 seals against the exterior of tubular member 82 to isolate latching fingers 84 and the interior of sleeve 82 surrounding tubular member 72 and 80 and setting and release chambers 164 and 168 from the fluids, dirt, impurities and other undesirable materials contained in the environment surrounding and within tubular connector 70.

Release of tubular connector 70 from its latched position is accomplished by venting hydraulic pressure from setting chamber 164 through passage 162 and delivering hydraulic pressure through passage 166 into release chamber 168. The pressure urges sleeve 82 upwardly and this movement of sleeve 82 moves surface 122 from its camming engagement with the exterior of latching fingers 84. The engagement of the lower end surface 142 of latching fingers 84 on surface 130 of ring 124 and the engagement of upper shoulder 156 on rib 152 with the lower surface of rib 100 occurs as the movement of sleeve 82 stops. This allows sleeve 82 to stop its movement at a position with its rib 112 a short distance below sealing ring 104 as shown in FIG. 3.

What is claimed is:

1. A tubular connector comprising
a first tubular member,
a second tubular member,
a sleeve slidably mounted on the exterior of one of the tubular members and extending toward the other of the tubular members,
at least a portion of said sleeve being spaced from said one of the tubular members to form a pressure chamber and including sealing means between the sleeve and said one of the tubular members at the upper and lower ends of the spaced portion to seal the pressure chamber,
a port extending through said one of said tubular members into said pressure chamber to supply pressure fluid thereto to move said sleeve between latched and released positions,
a plurality of latching fingers carried within the interior of the sleeve and having shoulders for clamping engagement with said tubular members to latch them together in abutting end-to-end relationship when the sleeve is moved axially to latched position,
initial axial latching movement of said sleeve carrying said latching fingers axially with respect to said tubular members to place said shoulders into position surrounding the ends of said tubular members,
means for restraining the axial movement of said latching fingers with said sleeve after they are in surrounding position to the ends of the tubular members,
mating cam surfaces on the interior of the sleeve and on the exterior of the latching fingers coacting to move the latching fingers into clamping engagement with the ends of the tubular members during the axial movement of the sleeve subsequent to the restraining of the axial movement of the latching fingers, and
means for isolating the interior of the sleeve and the latching means from the environment surrounding the tubular members when they are latched together.

2. A tubular connector according to claim 1 wherein said restraining means includes
shoulder means on said latching fingers, and
shoulder means on the exterior of said one of the tubular members and positioned to restrain said latching fingers surrounding the ends of the tubular members in position for clamping engagement of the tubular members.

3. A tubular connector according to claim 2 wherein the connecting ends of the tubular members include hubs and
said latching fingers engage opposite shoulders on the hubs of said tubular members to clamp the tubular members into tight engagement.

4. A tubular connector according to claim 1 wherein said isolating means includes
means sealing between the interior of the sleeve and the exterior of the other of the tubular members beyond the end of the latching fingers and between the interior of the sleeve and the exterior of said one of the tubular members.

5. a tubular connector according to claim 1 including metal sealing means for sealing between the interior surface at the connecting ends of the tubular members.

6. A tubular connector according to claim 1 wherein said pressure chamber includes
means between the sleeve and said one of the tubular members defining a setting chamber and a release chamber, and
means including said port for delivering fluid pressure to and venting fluid pressure from said chambers.

7. A tubular connector according to claim 1 wherein the lower end of said sleeve is tapered downardly and outwardly to guide said sleeve in its movement over said other tubular member.

8. A tubular connector comprising
a first tubular member having an enlarged end with an internal tapered sealing surface and an external rib spaced from said enlarged end,
a second tubular member having an enlarged end with an internal tapered sealing surface,
a sleeve surrounding and axially slidable on said second tubular member and having an interior surface near its end facing said first tubular member and pressure responsive means between said sleeve and said second tubular member for moving said sleeve axially of said second tubular member,
a plurality of latching fingers carried within said sleeve and with each latching finger having an external cam surface and means on its interior surface for engaging the external enlarged end of said first and said second tubular members,
means supporting said latching fingers wholly within said sleeve,
means for restraining the axial movement of said latching fingers with said sleeve subsequent to the positioning of the latching fingers around the enlarged ends of said tubular members,
a seal ring having external tapered sealing surfaces and secured in sealing engagement with said second tubular member sealing surface, actuation of said pressure responsive means moving said sleeve axially into surrounding relationship to the enlarged end of said first tubular member, moving said latching fingers with said sleeve axially of said tubular members to a position surrounding the enlarged ends of said tubular members, and thereafter camming said latching fingers into latching engagement with the enlarged ends of said first and said second tubular members to retain them in latched engagement with said seal ring sealing on the interior ssurfaces of said tubular members between said members.

* * * * *